United States Patent [19]

Ishikawa et al.

[11] Patent Number: 4,861,647

[45] Date of Patent: Aug. 29, 1989

[54] PRECOATING METAL SHEET FOR TWO-PIECE CAN

[75] Inventors: Hiroshi Ishikawa; Hiroshi Takano, both of Tokyo; Ryosuke Ohtomo; Yoshinori Hoshino, both of Kawagoe; Taro Ohyama, Tokyo, all of Japan

[73] Assignees: Nippon Kokan Kabushiki Kaisha; Toyo Ink Mfg. Co., Ltd., both of Tokyo, Japan

[21] Appl. No.: 167,355

[22] Filed: Mar. 14, 1988

Related U.S. Application Data

[62] Division of Ser. No. 7,755, Jan. 28, 1987, abandoned.

[30] Foreign Application Priority Data

Feb. 27, 1986 [JP] Japan .................................. 61-40363
May 19, 1986 [JP] Japan ................................ 61-112738

[51] Int. Cl.$^4$ ......................... B32B 7/02; B32B 15/08
[52] U.S. Cl. ................................... 428/216; 428/35.9; 428/336; 428/421; 428/422; 428/463; 428/467; 428/484

[58] Field of Search ................ 428/418, 416, 35, 336, 428/421, 216, 422, 467, 461, 463; 72/46, 42; 524/487, 488, 489, 173; 523/437, 465

[56] References Cited

U.S. PATENT DOCUMENTS

| | | | |
|---|---|---|---|
| 3,832,962 | 9/1974 | Rolles | 72/46 |
| 4,160,056 | 7/1979 | Tanaka et al. | 428/418 |
| 4,177,323 | 12/1979 | Obi et al. | 428/416 X |
| 4,210,259 | 7/1980 | Schrecker | 428/35 X |
| 4,355,124 | 10/1982 | Baumann et al. | 524/173 X |

FOREIGN PATENT DOCUMENTS

| | | | |
|---|---|---|---|
| 63787 | 6/1976 | Japan | 428/35 |
| 4753 | 2/1985 | Japan | 428/35 |

*Primary Examiner*—Thomas J. Herbert
*Attorney, Agent, or Firm*—Frishauf, Holtz, Goodman & Woodward

[57] ABSTRACT

A precoating for a two-piece can, comprising a thermosetting coating and an internal lubricant. The internal lubricant comprises a modified hydrocarbon wax having a structure in which a plurality of repeated units of a fluorine atoms substituted olefin are combined with a hydrocarbon wax.

8 Claims, No Drawings

PRECOATING METAL SHEET FOR TWO-PIECE CAN

This is a division of application Ser. No. 007,755, filed Jan. 28, 1987, now abandoned.

As far as we know, there are available the following prior art documents pertinent to the present invention:

(1) Japanese Patent Provisional Publication No. 51-63,787 dated June 2, 1976; and (2) Japanese Patent Publication No. 60-4,753 dated Feb. 6, 1985.

The contents of the above-mentioned prior art documents will be discussed hereafter under the heading of the "BACKGROUND OF THE INVENTION".

FIELD OF THE INVENTION

The present invention relates to a precoating for a two-piece can which comprises a can body and a top, to be applied in advance onto at least one surface of a metal sheet for manufacturing the can body of the two-piece can.

BACKGROUND OF THE INVENTION

A can body of a drawn and ironed can (hereinafter referred to as the "DI can") which is a kind of the twopiece cans, is conventionally manufactured by means of a drawing and ironing forming (hereinafter referred to as the "DI forming") which comprises the steps of: drawing a circular sheet cut from a metal sheet by forcedly passing the circular sheet through a die with the use of a punch to form a cup, and then, redrawing and ironing the thus formed cup by forcedly and continuously passing the cup through a plurality of different dies with the use of another punch, thereby obtaining a can body having a thickness remarkably smaller than that of the circular sheet.

A can body of a drawn and redrawn can (hereinafter referred to as the "DRD can") which is also a kind of the two-piece cans, is conveniently manufactured by means of a drawing and redrawing forming (hereinafter referred to as the "DRD forming") which comprises the steps of: drawing a circular sheet cut from a metal sheet by forcedly passing the circular sheet through a die with the use of a punch to form a cup, and then, redrawing the thus formed cup by forcedly passing the cup through another die with the use of another punch, thereby obtaining a can body.

The two-piece can such as the DI can or the DRD can as described above is light in weight because of the reduced thickness as compared with a so-called three-piece can which comprises a top, a bottom, and a drum prepared by soldering or welding, and free from leakage of the content because of the absence of a joint in the drum. For these advantages, there is an increasing demand for two-piece cans, and the range of uses thereof is expected to expand.

As a metal sheet for the two-piece can, it is the usual practice to use an electrolytic tin-plated steel sheet or an aluminum sheet. The demand for the two-piece can made of the electrolytic tin-plated steel sheets is expected to grow since the electrolytic tin-plated steel sheet is lower in cost than the aluminum sheet. The weight of deposited tin of the electrolytic tin-plated steel sheet is relatively slight. However, under the influence of the recent cost increase of electric power and tin, the increase in the manufacturing cost of the electrolytic tin-plated steel sheets and the two-piece cans made of the electrolytic tin-plated steel sheets is inevitable. There is therefore a strong demand for reducing the manufacturing cost of the electrolytic tin-plated steel sheets.

The reduction ratio of the thickness of the side wall of the can body of the DI can is so large as about 70% under the effect of ironing. It is therefore necessary to previously impart lubricity to the surface of the metal sheet. The tin plating layer of an electrolytic tin-plated steel sheet provides an excellent lubricity to the steel sheet. However, if the weight of the deposited tin plating layer is reduced with a view to reducing the manufacturing cost of the electrolytic tin-plated steel sheets, the following problems are caused in a DI can:

(1) The smaller weight of the deposited tin plating layer results in a lower lubricity which in turn leads to a lower DI formability. As a result, during the passage of the can body through the dies in ironing, a sticking of the can body to the dies or a galling of the can body may occur under the effect of friction heat. Occurrence of such sticking or galling deteriorates corrosion resistance of the DI can.

(2) Rust tends to occur on the surface of the can body of the DI can after removing grease such as an external lubricant deposited onto the surface of the can body of the DI can during ironing.

As methods for solving the above-mentioned problems, the following methods are known:

(1) A method for manufacturing a can body of the DI can, disclosed in Japanese Patent Provisional Publication No. 51-63,787 dated June 2, 1976, which comprises:

applying a precoating comprising any one of epoxy-phenolic resin, epoxy-ureaformaldehyde resin and vinyl resin, or a precoating comprising any one of the above-mentioned resins and an internal lubricant, onto at least one surface of a metal sheet to form a precoating film thereon, then partially curing the precoating film, and then subjecting the metal sheet having such a precoating film to the DI forming, thereby obtaining a can body of the DI can (hereinafter referred to as the "prior art 1").

(2) A method for manufacturing a can body of the DI can, disclosed in Japanese Patent Publication No. 60-4,753 dated Feb. 6, 1985, which comprises:

applying a precoating comprising epoxy-phenolic resin or a precoating comprising epoxy-phenolic resin and an internal lubricant onto the both surfaces of a surface-treated steel sheet to form a precoating film thereon, then partially curing the precoating film, then subjecting the surface-treated steel sheet having such a precoating film to the DI forming, and then completely curing the precoating film, thereby obtaining a can body of the DI can (hereinafter referred to as the "prior art 2").

The above-mentioned prior art 1 involves the following problems: because the precoating film is cured only partially, a precipitate from the precoating film not only degrades the flavor and perfume of the content in the can, but also leads to a lower corrosion resistance of the DI can after painting.

The above-mentioned prior art 2 involves the following problems: curing of the precoating film accomplished in two steps requires more complicated manufacturing processes and results in a higher manufacturing cost of the DI can.

On the other hand, a DRD can involves the problem in that, during the DRD forming of a metal sheet having a precoating film, the precoating film is damaged, and as a result, the inner surface of the can is easily corroded by the content in the can.

Under such circumstances, there is a strong demand for the development of a precoating for a two-piece can, which permits formation, on at least one surface of a metal sheet, of its film imparting excellent DI formability, DRD formability and corrosion resistance to the metal sheet and free from damage during the DI forming or the DRD forming of the metal sheet, but such a precoating for a two-piece can has not as yet been proposed.

SUMMARY OF THE INVENTION

An object of the present invention is therefore to provide a precoating for a two-piece can, which permits formation, on at least one surface of a metal sheet, of its film imparting excellent DI formability, DRD formability and corrosion resistance to the metal sheet and free from damage during the DI forming or the DRD forming of the metal sheet.

In accordance with one of the features of the present invention, there is provided a precoating for a two-piece can, which comprises:

a thermosetting coating comprising a resin as a solid content and a solvent; and
an internal lubricant;
characterized in that:
said internal lubricant comprises a modified hydrocarbon wax having a structure in which a plurality of repeated units of a fluorine atoms substituted olefin are combined with a hydrocarbon wax.

DETAILED DESCRIPTION OF PREFERRED EMBODIMENTS

From the above-mentioned point of view, extensive studies were carried out with a view to developing a precoating for a two-piece can, which permits formation, on at least one surface of a metal sheet, of its film imparting excellent DI formability, DRD formability and corrosion resistance to the metal sheet and free from damage during the DI forming or the DRD forming of the metal sheet. As a result of studies on properties of a precoating film contributing to lubricity during the DI forming, it was found that the DI formability is not improved by increasing lubricity in the low-pressure region, but is governed by lubricity in the high-pressure region.

More specifically, a precoating film should be excellent, in the high-pressure region, in ductility, adhesion to the metal sheet, and lubricity. It is furthermore necessary, during ironing, to always keep an external lubricant on the surface of the precoating film of the metal sheet passing through the dies, so as to permit full display of the functions of the external lubricant.

Further studies were carried out to develop a precoating for a two-piece can, which permits formation of its film having the above-mentioned properties on at least one surface of a metal sheet. As a result, it was found that a thermosetting coating containing, in a prescribed ratio, an internal lubricant comprising a modified hydrocarbon wax having a structure in which a plurality of repeated units of a fluorine atoms substituted olefin are combined with a hydrocarbon wax, is optimum as a precoating having the above-mentioned properties.

The present invention was made on the basis of the above-mentioned findings. The precoating for a two-piece can of the present invention comprises a thermosetting coating comprising a resin as a solid content and a solvent, and an internal lubricant, wherein, the internal lubricant comprises a modified hydrocarbon wax having a structure in which a plurality of repeated units of fluorine atom substituted olefins or are combined with a hydrocarbon wax.

The above-mentioned modified hydrocarbon wax is used as the internal lubricant because the modified hydrocarbon wax imparts lubricity to the precoating film and can thus improve DI formability and DRD formability of the metal sheet.

The content ratio of the modified hydrocarbon wax as the internal lubricant to the thermosetting coating comprising the resin as a solid content and the solvent should preferably be within the range of from 0.1 to 30 weight parts relative to 100 weight parts of the resin as the solid content in the thermosetting coating. With a content ratio of the modified hydrocarbon wax of under 0.1 weight part, improvement of DI formability of the metal sheet is insufficient. With a content ratio of the modified hydrocarbon wax of over 30 weight parts, on the other hand, the increased thixotropy not only leads to a lower paintability of the precoating but also requires a higher cost.

The melting point of the modified hydrocarbon wax as the internal lubricant should preferably be within the range of from 70° to 200° C. With a melting point of the modified hydrocarbon wax of under 70° C., the modified hydrocarbon wax is liquefied and dissociated from the thermosetting coating, or the resin and the modified hydrocarbon wax are separated from each other into lamination in the cured precoating film, thus resulting in an insufficient improvement of DI formability of the metal sheet, under certain conditions of storage of the modified hydrocarbon wax and in certain methods of its addition to the thermosetting coating. With a melting point of the modified hydrocarbon wax of over 200° C., on the other hand, the solid modified hydrocarbon wax remains in the cured precoating film, and as a result, irregularities are produced on the film surface, thus leading to an insufficient improvement of DI formability of the metal sheet.

The particle size of the modified hydrocarbon wax as the internal lubricant should preferably be within the range of from 1 to 5 μm. With a particle size of the modified hydrocarbon wax of under 1 μm, the cost becomes too high to be practicable. With a particle size of the modified hydrocarbon wax of over 5 μm, on the other hand, the modified hydrocarbon wax is not sufficiently dissolved during curing of the precoating film, and the solid modified hydrocarbon wax remains in the film. This causes irregularities on the film surface, thus leading to an insufficient improvement of DI formability of the metal sheet. Furthermore, the degraded dispersion stability of the modified hydrocarbon wax makes it difficult to store the precoating using such modified hydrocarbon wax for a long period of time.

The thermosetting coating comprises any one of a coating comprising vinyl chloride resin and at least one of phenolic resin and epoxy resin; a coating comprising epoxy resin and phenolic resin; a coating comprising epoxy resin and amino resin; a coating comprising polyester resin and amino resin; a coating comprising epoxy resin and acrylic resin; and a coating comprising epoxy ester resin and amino resin.

As the vinyl chloride resin, a fine particle vinyl chloride resin having a molecular weight of from about 10,000 to about 100,000 and a particle size of from 0.5 to 10 μm is used. By adding such a vinyl chloride resin to a solvent into which at least one of phenolic resin and epoxy resin as described later is dissolved, in a ratio of from 10 to 70 wt. % relative to the solid content in the thermosetting coating and causing the vinyl chloride resin to disperse, an organosol type vinyl chloride resin series thermosetting coating is obtained.

As the phenolic resin, a resin obtained by causing phenol such as carbolic acid, p-cresol, O-cresol, m-cresol, p-ethylphenol, p-tert.-butylphenol, p-nonylphenol, p-phenylphenol or bisphenol A to react with formaldehyde in the presence of a basic catalyst is used.

As the epoxy resin, bisphenol A type epoxy resin, hydrogenated bisphenol A type epoxy resin or bisphenol F type epoxy resin is used. Particularly, bisphenol A type epoxy resin obtained by causing bisphenol A to react with epichlorohydrin and having an average epoxide equivalent of from 1,500 to 4,000.

As the amino resin, a resin obtained by causing any one of urea, melamine and triazine compound to react with formaldehyde, or a resin obtained by etherifying the above-mentioned resin with the use of a monohydric alcohol have a carbon number of from 1 to 4, is used.

As the polyester resin, a resin obtained by causing a dibasic acid such as adipic acid, sebacic acid, phthalic acid, iso-phtalic acid or terephtalic acid to react with a dihydric alcohol such as ethylene glycol, polyethylene glycol, propylene glycol, polypropylene glycol or neopentyl glycol, is used. As the polyester resin, a resin obtained by using a fatty oil such as linseed oil, tung oil, dehydrated castor oil or soybean oil in place of the above-mentioned dibasic acid, may be used.

As the acrylic resin, a resin obtained by causing a carboxylic acid containing monomer such as acrylic acid, methacrylic acid or itaconic acid to polymerize with any one of acrylic acid alkyl ester, methacrylic acid alkyl ester and styrene type monomer, is used.

As the epoxy ester resin, a resin obtained by partially modifying the above-mentioned epoxy resin with the use of a higher saturated fatty acid or a higher unsaturated fatty acid such as palmitic acid, stearic acid, oleic acid, linoleic acid, linolenic acid, dehydrated castor oil, soybean oil, or coconut oil, is used.

The hydrocarbon wax forming the modified hydrocarbon wax as the internal lubricant comprises any one of polyethylene wax, polypropylene wax, paraffin wax, microcrystalline wax and petrolatum.

The fluorine atoms substituted olefin forming the modified hydrocarbon wax as the internal lubricant comprises any one of tetrafluoroethylene, trifluoroethylene and hexafluoropropylene.

In the case of a modified hydrocarbon wax using tetrafluoroethylene polymer, for example, the modified hydrocarbon wax as the internal lubricant may be synthesized through dehydroiodination of perfluoroalkyliodide [$CF_3(CF_2CF_2)_nI$] (where n: an integer of from 2 to 20) as the modifier with the above-mentioned hydrocarbon wax. The modifier is not limited to the above-mentioned perfluoroalkyliodide. The ratio of modification of the hydrocarbon wax by means of a plurality of repeated units of a fluorine atoms substituted olefin should preferably be within the range of the repeated units of the fluorine atoms substituted olefin of from 1 to 50 wt. % relative to the total weight of the modified hydrocarbon wax.

An animal or vegetable wax such as bees wax, spermaceti, tallow, carnauba wax or lanoline wax, or polyethylene wax, if used as the internal lubricant, cannot sufficiently increase lubricity during the DI forming of the metal sheet, and hence cannot improve DI formability of the metal sheet.

On the other hand, when a fluorine atoms substituted olefin wax such as polytetrafluoroethylene wax is used, for example, as the internal lubricant, which has a high melting point of over 300° C., a solid wax remains in the cured precoating film, resulting in the production of irregularities on the film surface. Moreover, a film of a precoating added with such a fluorine atoms substituted olefin wax has a low surface tension. The film has therefore a high water repellency and a high oil repellency. This causes troubles when applying a top coating onto the inner and outer surfaces of the can body formed from a metal sheet having such a film.

The metal sheet to which the above-mentioned precoating of the present invention is to be applied may be a cold-rolled steel sheet not surface-treated, a surface-treated steel sheet plated with tin, nickel or chromium, or an aluminum sheet. A chromium-plated steel sheet is particularly preferable because of the high corrosion resistance and the excellent adhesion of the precoating film. In the surface-treated steel sheet having a film of the precoating of the present invention, the plating layer is protected by the precoating film, so that the plating layer does not come into direct contact with the dies during the DI forming. Even after the DI forming, therefore, the plating layer is kept in a uniform state.

Application of the precoating of the present invention onto at least one surface of the metal sheet is accomplished by any of the known methods such as roll coating, spray coating, dipping coating and curtain flow coating. Application to a metal strip is usually conducted by means of reverse roll coating, from among the roll coating methods, in which the rolls rotate in the direction opposite to the travelling direction of the metal strip. On the other hand, application to a metal sheet cut to prescribed dimensions is effected by means of natural roll coating, in which the rolls rotate in the same direction as the travelling direction of the metal sheet.

The film of the precoating of the present invention formed on at least one surface of the metal sheet as described above is heated by blowing hot blast at a temperature of from 150° to 400° C. for a period of time of from 10 seconds to 10 minutes to completely cure the precoating film. Heating of the precoating film may be carried out by any or both of infrared-ray heating and high-frequency induction heating. Such heatings permit complete curing of the precoating film in a shorter period of time.

The thickness of the film of the precoating of the present invention formed on at least one surface of the metal sheet should preferably be within the range of from 1 to 10 μm per side of the metal sheet. With a thickness of the precoating film of under 1 μm, the precoating film is broken during the DI forming of the metal sheet and the continuity of the film cannot be ensured. This leads to a low DI formability of the metal sheet, resulting in the production of galling during the DI forming in the worst case. With a thickness of the precoating film of over 10 μm, on the other hand, a so-called build-up phenomenon tends to occur during the DI forming of the metal sheet, and in addition, requires a higher cost. When forming films of the precoating of the present invention on the both surfaces of the metal sheet, the two surfaces may have the same or different film thicknesses. The DI forming or the DRD forming of the metal sheet having a film of the precoating of the present invention is accomplished by any of the conventional methods as described above.

DI formability of the metal sheet can further be improved by forming a film of the precoating of the present invention comprising the thermosetting coating and the modified hydrocarbon wax as the internal lubricant on one surface of the metal sheet, which one surface is to be the outer surface of the can, and forming a film of the conventional precoating comprising only a thermosetting coating not containing an internal lubricant on the other surface of the metal sheet, which other surface is to be the inner surface of the can. The reason is conjectured as follows: by forming the above-mentioned two different precoating films on the both surfaces of the metal sheet respectively, there occurs a difference in lubricity in the high-pressure region between the precoating film on the one surface of the metal sheet in contact with the dies and the precoating film on the other surface of the metal sheet in contact with the punch, during ironing in the DI forming of the metal sheet. As a result, a difference occurs between the frictional force between the dies and the one surface of the metal sheet, on the one hand, and the frictional force between the punch and the other surface of the metal sheet, on the other hand, and the frictional force between the punch and the other surface of the metal sheet becomes larger. This difference in frictional force is considered to contribute to the improvement of DI formability of the metal sheet.

In addition, forming of the film of the precoating comprising only the thermosetting coating not containing the internal lubricant on the other surface of the metal sheet, which other surface is to be the inner surface of the can is favorable also in terms of cost.

The above-mentioned improvement in DI formability of the metal sheet leads to the presence of the uniform precoating films on the inner and outer surfaces of the can. In the case where the content to be filled into the can is a dried material or a liquid not so corrosive for the can, therefore, it is not necessary to form the top coating films on the inner and outer surfaces of the can. This eliminates the necessity of a process for forming the top coating film, thus permitting reduction of the manufacturing cost of the can.

When the content to be filled into the can is a liquid strongly corrosive for the can, or flavor or perfume of the content is particularly important, a known top coating including vinyl resin and epoxy-acrylic resin may be applied onto the inner surface of the can. As required, white painting and printing may be applied onto the outer surface of the can, and then, a top coating may be applied onto the surface thereof. By previously adding a white paint to the precoating to be applied onto the one surface of the metal sheet, which one surface is to be the outer surface of the can, it is possible to omit the step of white painting to be applied to the outer surface of the can as described above.

Now, the precoating of the present invention is described further in detail by means of examples while comparing with precoatings for comparison, outside the scope of the present invention.

EXAMPLES

Precoatings Nos. 1 to 7 of the present invention were prepared as follows:

I. Precoating No. 1 of the present invention:

The following materials were prepared as the materials for the precoating No. 1 of the present invention:

| | |
|---|---|
| (1) Thermosetting coating: (Organosol type thermosetting coating comprising vinyl chloride resin and phenolic resin) | |
| (a) Vinyl chloride paste resin: Product name: "SMILIT EX-13" (made by Sumitomo Chemical Co., Ltd.) | 45 weight parts |
| (b) Phenolic resin: Product name: "HITANOL 4020" (made by Hitachi Chemical Co., Ltd.) | 10 weight parts |
| (c) Oil-free alkyd resin: Product name: "ALMATEX P-646" (made by Mitsui Toatsu Chemicals, Inc.) | 25 weight parts |
| (d) Polyester type plasticizer: Product name: "POLYCIZER P-202" (made by Dainippon Ink And Chemicals, Inc.) | 20 weight parts |
| (2) Internal lubricant: Polytetrafluoroethylene modified polyethylene wax comprising polyethylene wax as the hydrocarbon wax and tetrafluoroethylene as the fluorine atoms substituted olefin: 20 weight parts relative to 100 weight parts of the solid content in the thermosetting coating Product name: "LANCO WAX TEF 1778" (made by George M. Langer & Co.) Melting point: from 100 to 110° C. Modification ratio: ratio of the polytetrafluoroethylene constituent being 9 wt. % | |
| (3) Organo-tin type stabilizer: relative to 100 weight parts of vinyl chloride paste resin | 1.6 weight parts |

Phenolic resin, oil-free alkyd resin and polyester type plasticizer under (1) above and organo-tin type stabilizer under (3) above were dissolved into a solvent comprising 40 wt. % xylene, 30 wt. % cellosolve acetate and 30 wt. % diisobutyl ketone, and then, vinyl chloride paste resin under (1) above and polytetrafluoroethylene modified polyethylene wax under (2) above were added to the abovementioned solvent while stirring the solvent at a high speed to disperse same into the solvent, and thus the precoating No. 1 of the present invention, having a solid content of about 45 wt. % and a viscosity of 90 seconds (coating temperature: 25° C., Ford cup: No. 4), was prepared.

II. Precoating No. 2 of the present invention: (Organosol type thermosetting coating comprising vinyl chloride resin and phenolic resin)

The precoating No. 2 of the present invention, having the same chemical composition as that of the precoating No. 1 of the present invention except that the content of polytetrafluoroethylene modified polyethylene wax as the internal lubricant in the above-mentioned precoating No. 1 of the present invention was changed to 10 weight parts relative to 100 weight parts of the solid content in the thermosetting coating, was prepared.

III. Precoating No. 3 of the present invention: (Organosol type thermosetting coating comprising vinyl chloride resin and phenolic resin)

The precoating No. 3 of the present invention, having the same chemical composition as that of the precoating No. 1 of the present invention except that the content of polytetrafluoroethylene modified polyethylene wax as the internal lubricant in the above-mentioned precoating No. 1 of the present invention was changed to 5 weight parts relative to 100 weight parts of the solid content in the thermosetting coating, was prepared.

IV. Precoating No. 4 of the present invention:

The following materials were prepared as the materials for the precoating No. 4 of the present invention:

| | |
|---|---|
| (1) Thermosetting coating: (Organosol type thermosetting coating comprising vinyl chloride resin, phenolic resin and epoxy resin) | |
| (a) Vinyl chloride paste resin: Product name: "SMILIT EX-13" (made by Sumitomo Chemical Co., Ltd.) | 40 weight parts |
| (b) Phenolic resin: Product name: "HITANOL 4020" (made by Hitachi Chemical Co., Ltd.) | 16 weight parts |
| (c) Vinyl chloride-vinyl acetate-maleic acid copolymer: Product name: "BAKELITE VMCC" (made by Union Carbide Co., Ltd.) | 40 weight parts |
| (d) Bisphenol A type epoxy resin: Product name: "EPIKOTE 828" (made by Yuka Shell Epoxy Co., Ltd.) | 4 weight parts |
| (2) Internal lubricant: Polytetrafluoroethylene modified polyethylene wax: 20 weight parts relative to 100 weight parts of the solid content in the thermosetting coating (The product name, the maker, the melting point and the modification ratio thereof being the same as those described for the precoating No. 1 of the present invention.) | |

Phenolic resin, vinyl chloride-vinyl acetatemaleic acid copolymer and bisphenol A type epoxy resin under (1) above were dissolved into a solvent comprising 40 wt. % xylene, 30 wt. % cellosolve acetate and 30 wt. % diisobutyl ketone, and then, vinyl chloride paste resin under (1) above and polytetrafluoroethylene modified polyethylene wax under (2) above were added to the abovementioned solvent while stirring the solvent at a high speed to disperse same into the solvent, and thus the precoating No. 4 of the present invention, having a solid content of about 30 wt. % and a viscosity of 110 seconds (coating temperature: 25° C., Ford cup: No. 4), was prepared.

V. Precoating No. 5 of the present invention:

The following materials were prepared as the materials for the precoating No. 5 of the present invention:

| | |
|---|---|
| (1) Thermosetting coating: (Thermosetting coating comprising epoxy resin and phenolic resin) | |
| (a) Bisphenol A type epoxy resin Product name: "EPIKOTE 1009" (made by Yuka Shell Epoxy Co., Ltd.) | 80 weight parts |
| (b) Phenolic resin: Product name: "HITANOL 4020" (made by Hitachi Chemical Co., Ltd.) | 20 weight parts |
| (2) Internal lubricant: Polytetrafluoroethylene modified polyethylene wax: 20 weight parts relative to 100 weight parts of the solid content in the thermosetting coating (The product name, the maker, the melting point and the modification ratio thereof are the same as those described for the precoating No. 1 of the present invention.) | |

Bisphenol A type epoxy resin and phenolic resin under (1) above were dissolved into a solvent comprising 12 wt. % xylene, 55 wt. % cellosolve acetate, 10 wt. % N-butanol and 23 wt. % cyclohexanone, and then, polytetrafluoroethylene modified polyethylene wax under (2) above was added to the above-mentioned solvent while stirring the solvent at a high speed to disperse same into the solvent, and thus, the precoating No. 5 of the present invention, having a solid content of about 30 wt. % and a viscosity of 70 seconds (coating temperature: 25° C., Ford cup: No. 4), was prepared.

VI. Precoating No. 6 of the present invention:

The following materials were prepared as the materials for the precoating No. 6 of the present invention:

| | |
|---|---|
| (1) Thermosetting coating: <br> (Thermosetting coating comprising epoxy resin and amino resin) <br> (a) Bisphenol A type epoxy resin: <br>     Product name: "EPIKOTE 1007" (made by Yuka Shell Epoxy Co., Ltd.) <br> (b) Urea formaldehyde resin: <br>     Product name: "MELAN 11E" (made by Hitachi Chemical Co., Ltd.) <br> (2) Internal lubricant: <br> Polytetrafluoroethylene modified polyethylene wax: <br> 20 weight parts relative to 100 weight parts of the solid content in the thermosetting coating <br> (The product name, the maker, the melting point and the modification ratio thereof being the same as those described for the precoating No. 1 of the present invention.) | 90 weight parts <br><br><br> 10 weight parts |

Bisphenol A type epoxy resin and urea formaldehyde resin under (1) above were dissolved into a solvent comprising 15 wt. % diacetone alcohol, 7 wt. % methyl isobutyl carbitol and 78 wt. % ethyl cellosolve, and then, polytetrafluoroethylene modified polyethylene wax under (2) above was added to the above-mentioned solvent while stirring the solvent at a high speed to disperse same into the solvent, and thus, the precoating No. 6 of the present invention having a solid content of about 30 wt. % and a viscosity of 50 seconds (coating temperature: 25° C., Ford cup: No. 4), was prepared.

VII. Precoating No. 7 of the present invention:

The following materials were prepared as the materials for the precoating No. 7 of the present invention:

| | |
|---|---|
| (1) Thermosetting coating: <br> (Thermosetting coating comprising polyester resin and amino resin) <br> (a) Polyester resin: <br>     Product name: "VYLON RV560" (made by Toyobo Co., Ltd.) <br> (b) Benzoguanamine resin: <br>     Product name: "MELAN 366" (made by Hitachi Chemical Co., Ltd.) <br> (c) Bisphenol A type epoxy resin: <br>     Product name: "EPIKOTE 828" (made by Yuka Shell Epoxy Co., Ltd.) <br> (2) Internal lubricant: <br> Polytetrafluoroethylene modified polyethylene wax: <br> 20 weight parts relative to 100 weight parts of the solid content in the thermosetting coating <br> (The product name, the maker, the melting point and the modification ratio thereof being the same as those described for the precoating No. 1 of the present invention.) | 70 weight parts <br><br> 25 weight parts <br><br> 5 weight parts |

Polyester resin, benzoguanamine resin and bisphenol A type epoxy resin under (1) above were dissolved into a solvent comprising 50 wt. % xylene and 50 wt. % cellosolve acetate, and then, polytetrafluoroethylene modified polyethylene wax under (2) above was added to the abovementioned solvent while stirring the solvent at a high speed to disperse same into the solvent, and thus, the precoating No. 7 of the present invention, having a solid content of about 30 wt. % and a viscosity of 40 seconds (coating temperature: 25° C., Ford cup: No. 4), was prepared.

Then, precoatings, No. 1 to 5 for comparison outside the scope of the present invention were prepared as follows:

I. Precoating No. 1 for comparison:

(Organosol type thermosetting coating comprising vinyl chloride resin and phenolic resin)

The precoating No. 1 for comparison, having the same chemical composition as that of the precoating No. 1 of the present invention except that the following internal lubricant was used in place of the polytetrafluoroethylene modified polyethylene wax in the precoating No. 1 of the present invention, was prepared:

Internal lubricant:

Polytetrafluoroethylene wax: 20 weight parts relative to 100 weight parts of the solid content in the thermosetting coating Product name: "LUBLON L-5" (made by Daikin Kogyo Co., Ltd.)

Melting point: 326° C.

II. Precoating No. 2 for comparison:

(Organosol type thermosetting coating comprising vinyl chloride resin and phenolic resin)

The precoating No. 2 for comparison, having the same chemical composition as that of the precoating No. 1 of the present invention except that the following internal lubricant was used in place of the polytetrafluoroethylene modified polyethylene wax in the precoating No. 1 of the present invention, was prepared:

Internal lubricant:

Microcrystalline wax: 20 weight parts relative to 100 weight parts of the solid content in the thermosetting coating Product name: "ULTRAFLEX" (made by Toyo Petrolite Co., Ltd.)

Melting point: 65° C.

III. Precoating No. 3 for comparison:

(Organosol type thermosetting coating comprising vinyl chloride resin and phenolic resin)

The precoating No. 3 for comparison, having the same chemical composition as that of the precoating No. 1 of the present invention except that the following internal lubricant was used in place of the polytetrafluoroethylene modified polyethylene wax in the precoating No. 1 of the present invention, was prepared.

Internal lubricant:
Lanoline: 20 weight parts relative to 100 weight parts of the solid content in the thermosetting coating
Product name: "HARDLANOLINE" (made by Yoshikawa Seiyu Co., Ltd.)

IV. Precoating No. 4 for comparison:

(Thermosetting coating comprising epoxy resin and phenolic resin)

The precoating No. 4 for comparison, having the same chemical composition as that of the precoating No. 5 of the present invention except that no internal lubricant was added, was prepared.

V. Precoating No. 5 for comparison:

(Organosol type thermosetting coating comprising vinyl chloride resin and phenolic resin)

The precoating No. 5 for comparison, having the same chemical composition as that of the precoating No. 1 of the present invention except that no internal lubricant was added, was prepared.

As metal sheets onto which the precoatings Nos. 1 to 7 of the present invention and the precoatings Nos. 1 to 5 for comparison are applied, surface-treated steel sheets A and B and a steel sheet not surface-treated C were prepared as follows:

I. Surface-treated steel sheet A:

(Electrolytic chromated steel sheet)

The both surfaces of a low-carbon cold-rolled steel sheet having a thickness of 0.3 mm were cleaned through conventional electrolytic degreasing and electrolytic pickling, and then, the above-mentioned steel sheet was subjected to a cathodic electrolytic treatment under the following conditions to form, on each of the both surfaces of the steel sheet, a metallic chromium layer in an amount of 50 mg/m$^2$ per side and a hydrated chromium oxide layer in an amount of 15 mg/m$^2$ per side on the metallic chromium layer:

| (1) | Chemical composition of bath: | |
| --- | --- | --- |
| | Chromic anhydride (chromium trioxide) ($CrO_3$) | 70 g/l |
| | Ammonium fluoride ($NH_4F$) | 20 g/l |
| (2) | Bath temperature | 50° C. |
| (3) | Current density | 30 A/dm$^2$ |
| (4) | Treating time | 1 second |

II. Surface-treated steel sheet B:

(Electrolytic tin-plated steel sheet)

The both surfaces of a low-carbon cold-rolled steel sheet having a thickness of 0.3 mm were cleaned through conventional electrolytic degreasing and electrolytic pickling, and then, the above-mentioned steel sheet was subjected to an electrolytic tin plating treatment under the following conditions to form, on each of the both surfaces of the steel sheet, a tin plating layer in an amount of 0.34 g/m$^2$ per side:

| (1) | Chemical composition of bath: | |
| --- | --- | --- |
| | Tin ($Sn^{2+}$) | 30 g/l |
| | Free acid (as converted into sulfuric acid) | 15 g/l |
| | Epoxy naphthol sulfonic acid | 5 g/l |
| (2) | Bath temperature | 40° C. |
| (3) | Current density | 6 A/dm$^2$ |

-continued

| (4) | Treating time | 1 second |
| --- | --- | --- |

Then, the low-carbon cold-rolled steel sheet on each of the both surfaces of which the tin plating layer has been formed, was subjected to a cathodic electrolytic treatment under the following conditions to form a hydrated chromium oxide layer in an amount of 15 mg/m$^2$ per side on the tin plating layer:

| (1) | Chemical composition of bath: | |
| --- | --- | --- |
| | Chromic anhydride | |
| | (chromium trioxide) ($CrO_3$) | 30 g/l |
| (2) | Bath temperature | 50° C. |
| (3) | Current density | 30 A/dm$^2$ |
| (4) | Treating time | 1 second |

III. Steel sheet not surface-treated C:

(Low-carbon cold-rolled steel sheet having a thickness of 0.3 mm)

Using the above-mentioned precoatings Nos. 1 to 7 of the present invention and the above-mentioned steel sheets A to C, steel sheets onto at least one surface of each of which a film of the precoating of the present invention was formed (hereinafter referred to as the "steel sheets of the invention") Nos. 1 to 12, were prepared as shown in Table 1.

For comparison purposes, using the above-mentioned precoatings Nos. 1 to 5 for comparison outside the scope of the present invention and the above-mentioned steel sheets A and B, steel sheets on the both surfaces of each of which a film of the precoating for comparison outside the scope of the present invention was formed (hereinafter referred to as the "steel sheets for comparison") Nos. 1 to 6, were prepared as shown also in Table 1.

Each of the above-mentioned steel sheets of the invention and the steel sheets for comparison was prepared by applying any one of the above-mentioned precoatings of the present invention and precoatings for comparison onto the surface of the steel sheet with a thickness of 5 μm by means of the rolls, and then, curing the thus formed precoating film at a temperature of 205° C. for ten minutes in a box type oven.

TABLE 1

| | Kind of precoating | | Kind |
| --- | --- | --- | --- |
| | For one surface of steel sheet to be outer surface | For the other surface of steel sheet to be inner | of steel |
| No. | of can | surface of can | sheet |
| | Steel sheet of the invention | | |
| 1 | Precoating No. 1 of the present invention | Precoating No. 1 of the present invention | A |
| 2 | Precoating No. 4 of the present invention | Precoating No. 4 of the present invention | A |
| 3 | Precoating No. 5 of the present invention | Precoating No. 5 of the present invention | A |
| 4 | Precoating No. 6 of the present invention | Precoating No. 6 of the present invention | A |
| 5 | Precoating No. 7 of the present invention | Precoating No. 7 of the present invention | A |
| 6 | Precoating No. 1 of the present invention | Precoating No. 1 of the present invention | B |
| 7 | Precoating No. 1 of the present invention | Precoating No. 1 of the present invention | C |
| 8 | Precoating No. 1 of the present invention | Precoating No. 5 for comparison | A |
| 9 | Precoating No. 2 of the present invention | Precoating No. 5 for comparison | A |
| 10 | Precoating No. 3 of the present invention | Precoating No. 5 for comparison | A |

TABLE 1-continued

| | Kind of precoating | | Kind |
|---|---|---|---|
| No. | For one surface of steel sheet to be outer surface of can | For the other surface of steel sheet to be inner surface of can | of steel sheet |
| 11 | Precoating No. 2 of the present invention | Precoating No. 4 for comparison | A |
| 12 | Precoating No. 1 of the present invention | Precoating No. 5 for comparison | C |
| | Steel sheet for comparison | | |
| 1 | Precoating No. 1 for comparison | Precoating No. 1 for comparison | A |
| 2 | Precoating No. 2 for comparison | Precoating No. 2 for comparison | A |
| 3 | Precoating No. 3 for comparison | Precoating No. 3 for comparison | A |
| 4 | Precoating No. 4 for comparison | Precoating No. 4 for comparison | A |
| 5 | Precoating No. 5 for comparison | Precoating No. 5 for comparison | A |
| 6 | Precoating No. 5 for comparison | Precoating No. 5 for comparison | B |

For each of the steel sheets of the invention Nos. 1 to 12 and the steel sheets for comparison Nos. 1 to 6, DI formability, adhesion of the precoating film, strippability and corrosion resistance were evaluated by the following performance tests. The results of evaluation are shown in Table 2.

(1) DI formability:

First, in accordance with the above-mentioned conventional DI forming, a can body of the DI can was prepared from a circular sheet having a diameter of 123 mm cut from each of the steel sheets of the invention Nos. 1 to 12 and the steel sheets for comparison Nos. 1 to 6. More specifically, the circular sheet was subjected to a drawing by forcedly passing the circular sheet through a die with the use of a punch to form a cup having an inner diameter of 72 mm and a height of 36 mm. Then the thus formed cup was subjected to a redrawing and a three-stage ironing by forcedly and continuously passing the cup through a plurality of different dies with the use of another punch at a punch speed of 30m/minute and a punch stroke of 600 mm to obtain a can body of the DI can, which can body had an inner diameter of 52 mm and a height of 130 mm. The reduction ratios for the three stages of ironing were 30%, 28% and 24%, respectively. During the redrawing and the ironing, a conventional external lubricant at a temperature within the range of from the room temperature to 100° C. was supplied into the gap between the dies and the outer surface of the cup, and into the gap between the punch and the inner surface of the cup.

DI formability was evaluated by measuring a forming load at each of the reductions for the three stages of ironing in the DI forming of the can body by means of a load cell attached to the punch, calculating a forming energy at each of the reductions for the three stages of ironing from the punch stroke in accordance with the following formula:

$$E = \int P.g.ds$$

where,
E: forming energy,
P: forming load,
g: gravitational acceleration, and
ds: variation of punch stroke,
then, totalling the values of the thus calculated forming energy (E) at the reductions for the three stages of ironing, and using the thus obtained total amount of the values of forming energy (E) as the criterion. It is needless to mention that a smaller total amount of forming energy (E) represents a higher DI formability.

(2) Adhesion of the precoating film:

Adhesion of the precoating film was evaluated by measuring the area of the precoating film remained on the outer surface of the can body which was prepared in accordance with the DI forming described as to DI formability under (1) above, by means of a transparent section paper, and using a percentage of the measured area of the precoating film to the area of the outer surface of the can body as the criterion.

(3) Strippability:

Strippability was evaluated by means of decrease in height of the can body, which represents the phenomenon of buckling of the side wall of the can body under the effect of frictional resistance between the punch and the inner surface of the can body during preparation of the can body in accordance with the DI forming described as to DI formability under (1) above. The basic height of the can body was 130 mm.

(4) Corrosion resistance:

First, a conventional degreasing liquid having a pH value of 8.5, concentration of 2 wt. % and a temperature of 50° C. was sprayed for two minutes onto both of the inner and outer surfaces of the can body which was prepared in accordance with the DI forming described as to the DI formability under (1) above, to remove the external lubricant deposited onto the both surfaces of the can body. Then a 20 wt. % solution of the following conventional top coating (solvent thereof comprising methyl ethyl ketone and xylene):

Top coating:
Vinyl chloride-vinyl acetate-maleic acid copolymer:
Product name: "BAKELITE VMCH (made by Union Carbide Co., Ltd.)

was sprayed onto the inner surface of the can body in an amount of 250 mg per can body to form a top coating film on the inner surface of the can body. Then, the thus formed top coating film was baked at a temperature of 205° C. for three minutes.

Regarding corrosion resistance, under cutting corrosion resistance (hereinafter referred to as "UCC resistance") and iron pickup resistance (hereinafter referred to as "IP resistance") were evaluated for the inner surface of the can body, and filiform corrosion resistance (hereinafter referred to as "FFC resistance") was evaluated for the outer surface of the can body, through the following performance tests.

(a) Under cutting corrosion test:

An under cutting corrosion test was carried out as follows: a test piece having dimensions of 50 mm×70 mm was sampled from each of the can bodies prepared as described above. A cruciform notch was provided to a depth reaching the substrate on one surface of the test piece, which corresponds to the inner surface of the can body, and an adhesive tape was stuck onto the other surface of the test piece, which corresponds to the outer surface of the can body, and the edge of the test piece, to seal the other surface and the edge of the test piece. Then, the test piece was immersed into a test solution containing 1.5 wt. % citric acid and 1.5 wt. % sodium chloride and having a temperature of 38° C. for 96 hours. Then, an adhesive tape was stuck onto the cruciform notch portion on the one surface of the test piece, and then, the adhesive tape was peeled off. The width of corrosion on the cruciform notch portion and the state of peeloff of the precoating and the top coating were investigated for the evaluation of UCC resistance. The criteria of evaluation are as follows:

⦾ : excellent,
○ : good,
△: fair,
x: poor.

(b) Iron pickup test:

An iron pickup test was carried out as follows: each of the can bodies prepared as described above was filled with Pepsi Cola in an amount of 250 cc, and the can body was air-tightly closed by fitting a top. The can thus filled with Pepsi Cola was left at a temperature of 38° C. for six months, and the amount of Fe ions (ppm) dissolved from the can into Pepsi Cola was measured by the atomic absorption analysis for the invention of IP resistance.

(c) Filiform corrosion test:

A filiform corrosion test was carried out as follows: a test piece having dimensions of 50 mm×70 mm was sampled from each of the can bodies prepared as described above. A cruciform notch was provided to a depth reaching the substrate on one surface of the test piece, which corresponds to the outer surface of the can body, and an adhesive tape was stuck onto the other surface of the test piece, which corresponds to the inner surface of the can body, and the edge of the test piece, to seal the other surface and the edge of the test piece. Then, the test piece was subjected to a salt spray test with salt water at a temperature of about 35° C. for one hour. Then, the test piece was washed with water, and the test piece was left for five weeks in a thermohygrostate chamber at a temperature of 25° C. and a relatively humidity of 85%. The width and the length of the filiform corrosion on the cruciform notch portion were investigated for the evaluation of FFC resistance. The criteria of evaluation are as follows:

⦾ : excellent,
○ : good,
△: fair,
x: poor.

TABLE 2

| No. | DI formability (Forming energy in Joule) | Adhesion of precoating film (%) | Strippability (mm) | Corrosion resistance | | |
|---|---|---|---|---|---|---|
| | | | | UCC resistance | IP resistance (ppm) | FFC resistance |
| Steel sheet of the invention | | | | | | |
| 1 | 2700 | 100 | 130 | ⦾ | trace | ⦾ |
| 2 | 3100 | 100 | 128 | ⦾ | 1> | ○ |
| 3 | 3200 | 100 | 130 | ⦾ | trace | ⦾ |
| 4 | 3400 | 100 | 130 | ⦾ | trace | ⦾ |
| 5 | 3600 | 98 | 129 | ○ | 1> | ○ |
| 6 | 2500 | 100 | 130 | ⦾ | trace | ⦾ |
| 7 | 2900 | 97 | 127 | △ | 50< | △ |
| 8 | 2200 | 100 | 130 | ⦾ | trace | ⦾ |
| 9 | 2500 | 100 | 130 | ⦾ | trace | ⦾ |
| 10 | 2700 | 97 | 129 | ⦾ | trace | ⦾ |
| 11 | 2500 | 100 | 130 | ⦾ | trace | ⦾ |
| 12 | 2400 | 100 | 130 | △ | 50< | △ |
| Steel sheet for comparison | | | | | | |
| 1 | 3800 | 80 | 123 | x | 50< | x |
| 2 | 4500 | 50 | 85 | △ | 25 | x |
| 3 | 4500 | 50 | 85 | △ | 25 | x |
| 4 | 5000 | 20 | 70 | x | 50< | x |
| 5 | 4100 | 75 | 125 | ⦾ | trace | ⦾ |
| 6 | 3900 | 70 | 125 | ⦾ | trace | ⦾ |

As is clear from Table 2, the steel sheets for comparison Nos. 1 to 3, on which the films of the precoatings Nos. 1 to 3 for comparison containing the internal lubricants different from that of the precoating of the present invention are respectively formed, and the steel sheets for comparison Nos. 4 to 6, on which the films of the precoatings Nos. 4 and 5 for comparison not containing an internal lubricant are respectively formed, show a low DI formability and a poor adhesion of the precoating film. Particularly in the steel sheets for comparison Nos. 2 and 3, the galling was produced during ironing, and in the steel sheet for comparison No. 4, the sticking was produced during ironing. In addition, the steel sheets for comparison Nos. 2 to 4 show a low strippability, and the steel sheets for comparison Nos. 1 to 4 show a low corrosion resistance on the inner and outer surfaces of the can body.

In contrast, all the steel sheets of the invention Nos. 1 to 12 are excellent in DI formability, adhesion of the precoating film, and strippability. In the steel sheets of the invention Nos. 8 to 12, in each of which a film of the precoating of the present invention is formed on one surface to be the outer surface of the can body, and a film of the precoating not containing an internal lubricant, outside the scope of the present invention, is formed on the other surface to be the inner surface of the can body, the forming energy is smaller and especially DI formability is higher than in the other steel sheets of the invention. The steel sheets of the invention Nos. 1 to 6 and 8 to 11, in each of which a film of the precoating of the present invention is formed on at least one surface of the surface-treated steel sheet, show a high corrosion resistance on the inner and outer surfaces of the can body. The steel sheets of the invention Nos. 7 and 12, in each of which a film of the precoating of the present invention is formed on a steel sheet not surfacetreated, showing a lower corrosion resistance on the inner and outer surfaces of the can body, have no problem, depending upon the contents in the can, since the steel sheets of the invention Nos. 7 and 12 are excellent in DI formability, adhesion of the precoating and strippability, as described above. The film of the precoating No. 1 of the present invention is continuous and uniform even after the Di forming because the steel sheet of the invention No. 1 having the film of the precoating No. 1 of the present invention is excellent in DI formability. On the other hand, the film of the precoating No. 2 for comparison is discontinuous and non-uniform after the DI forming because the steel sheet for comparison No. 2 having the film of the precoating No. 2 for comparison has a low DI formability.

In the above-mentioned examples, the surfacetreated steel sheet and the steel sheet not surface-treated were used as the metal sheet for the application of the precoating of the present invention when manufacturing the DI can. However, an aluminum sheet is also available as the metal sheet for the application of the precoating of the present invention. Furthermore, the precoating of the present invention is also available to the metal sheet for the manufacture of the DRD can by the DRD forming.

As described above in detail, the precoating for a two-piece can of the present invention permits formation, on at least one surface of a metal sheet, of its film which imparts excellent DI formability, DRD formability and corrosion resistance to the metal sheet and is free from damage during the DI forming or the DRD forming of the metal sheet, thus providing many industrially useful effects.

What is claimed is:

1. A precoated metal sheet for a two-piece can, which comprises:
   a metal sheet having first and second opposed surfaces and
   a film formed on said first surface of said metal sheet by applying a precoating composition onto said first surface and then curing same, said precoating composition comprising:
   (a) a thermosetting coating material comprising a resin as a solid content and a solvent, said resin comprising any one of a mixture of vinyl chloride resin and at least one of phenolic resin and epoxy resin; a mixture of epoxy resin and phenolic resin; a mixture of epoxy resin and amino resin; a mixture of polyester resin and amino resin; a mixture of epoxy resin and acrylic resin; and a mixture of epoxy ester resin and amino resin; and
   (b) an internal lubricant, said internal lubricant comprising a modified hydrocarbon wax having a structure in which a plurality of repeated units of a fluorine substituted olefin are combined with a hydrocarbon wax, and having a melting point within the range of from 70° to 200° C. and a particle size within the range of from 1 to 5 $\mu$m, and the content ratio of said modified hydrocarbon wax as said internal lubricant is within the range of from 0.1 to 30 weight parts relative to 100 weight parts of said resin as said solid content in said thermosetting coating material;
   wherein:
   said first surface of said metal sheet is to be an outer surface of said two-piece can; and
   said second surface of said metal sheet is to be an inner surface of said two-piece can, and said second surface has thereon another film formed by applying a precoating composition which comprises said thermosetting coating material and substantially contains no internal lubricant, onto said second surface and then curing same.

2. The precoated metal sheet of claim 1, wherein:
   the thickness of said film of said precoating composition formed on said first surface of said metal sheet is within the range of from 1 to 10 $\mu$m.

3. The precoated metal sheet of claim 2, wherein:
   the thickness of said another film of said precoating composition formed on said second surface of said metal sheet is from 1 to 10 $\mu$m.

4. The precoated metal sheet of claim 1, wherein:
   said hydrocarbon wax forming said modified hydrocarbon wax as said internal lubricant comprises any one of polyethylene wax, polypropylene wax, paraffin wax, microcrystalline wax and petrolatum.

5. The precoated metal sheet of claim 1, wherein:
   said fluorine substituted olefin forming said modified hydrocarbon wax as said internal lubricant comprises any one of tetrafluoroethylene, trifluoroethylene, and hexafluoropropylene.

6. The precoated metal sheet of claim 1, wherein:
   said modified hydrocarbon wax as said internal lubricant is a polytetrafluoroethylene modified polyethylene wax which comprises polyethylene wax as said hydrocarbon wax, and tetrafluoroethylene as said fluorine substituted olefin.

7. The precoated metal sheet of claim 1, wherein: said metal sheet comprises a steel sheet.

8. The precoated metal sheet of claim 1, wherein: said metal sheet comprises an aluminum sheet.

* * * * *